(12) United States Patent
Taghavi Nasrabadi et al.

(10) Patent No.: US 10,412,746 B2
(45) Date of Patent: Sep. 10, 2019

(54) METHOD FOR FORWARDING IN PEER-TO-PEER WIRELESS COMMUNICATIONS

(71) Applicant: QUALCOMM Incorporated, San Diego, CA (US)

(72) Inventors: Mohammad Hossein Taghavi Nasrabadi, San Diego, CA (US); Hemanth Sampath, San Diego, CA (US); Santosh Paul Abraham, San Diego, CA (US); Avinash Jain, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 296 days.

(21) Appl. No.: 14/295,185

(22) Filed: Jun. 3, 2014

(65) Prior Publication Data

US 2014/0286262 A1     Sep. 25, 2014

Related U.S. Application Data

(63) Continuation of application No. 12/619,170, filed on Nov. 16, 2009, now abandoned.

(60) Provisional application No. 61/255,971, filed on Oct. 29, 2009.

(51) Int. Cl.
| | |
|---|---|
| *H04W 72/08* | (2009.01) |
| *H04W 24/10* | (2009.01) |
| *H04W 4/00* | (2018.01) |
| *H04W 84/04* | (2009.01) |
| *H04W 8/00* | (2009.01) |

(52) U.S. Cl.
CPC ........ *H04W 72/085* (2013.01); *H04W 24/10* (2013.01); *H04W 4/00* (2013.01); *H04W 8/005* (2013.01); *H04W 84/047* (2013.01)

(58) Field of Classification Search
CPC ..... H04W 72/085; H04W 24/10; H04W 4/00; H04W 8/005; H04W 84/047; H04W 88/00
See application file for complete search history.

(56) References Cited

U.S. PATENT DOCUMENTS

| | | | |
|---|---|---|---|
| 6,415,146 B1 | 7/2002 | Capece | |
| 6,678,341 B1 | 1/2004 | Miyake et al. | |
| 7,656,849 B1 * | 2/2010 | Evans | 370/338 |

(Continued)

FOREIGN PATENT DOCUMENTS

| | | |
|---|---|---|
| CN | 1902836 A | 1/2007 |
| EP | 1650883 A2 | 4/2006 |

(Continued)

OTHER PUBLICATIONS

Basak Can, et al., "PHY 02-2—Efficient Cooperative Diversity Schemes and Radio Resource Allocation for IEEE 802.16j", Wireless Communications and Networking Conference, 2008. WCNC 2008. IEEE, IEEE, Piscataway, NJ, USA, Mar. 31, 2008 (Mar. 31, 2008), pp. 36-41, XP031243597.

(Continued)

*Primary Examiner* — Kibrom T Hailu
(74) *Attorney, Agent, or Firm* — Steven R. Thiel; Patterson & Sheridan LLP

(57) ABSTRACT

Certain aspects of the present disclosure relate to a method for forwarding of data in peer-to-peer transactions by a high-capability wireless device, such as an access point.

19 Claims, 7 Drawing Sheets

(56) References Cited

U.S. PATENT DOCUMENTS

| | | | |
|---|---|---|---|
| 8,050,213 | B2 | 11/2011 | Sun et al. |
| 8,238,835 | B2 | 8/2012 | Nagai et al. |
| 8,255,714 | B2 | 8/2012 | Singh et al. |
| 8,797,848 | B2 * | 8/2014 | Kwon et al. ............... 370/227 |
| 2004/0063458 | A1 | 4/2004 | Hori et al. |
| 2004/0160980 | A1 | 8/2004 | Miyoshi |
| 2004/0235489 | A1 * | 11/2004 | Kwon ............... H04W 88/04 455/452.2 |
| 2005/0036469 | A1 | 2/2005 | Wentink |
| 2005/0094588 | A1 * | 5/2005 | Wentink ............... 370/315 |
| 2005/0107102 | A1 * | 5/2005 | Yoon ............... H04W 74/00 455/466 |
| 2005/0130634 | A1 | 6/2005 | Godfrey |
| 2006/0193292 | A1 | 8/2006 | Bansal et al. |
| 2006/0270415 | A1 | 11/2006 | Waxman |
| 2007/0230423 | A1 * | 10/2007 | Yoshida et al. ............... 370/338 |
| 2007/0274241 | A1 * | 11/2007 | Brothers ............... H04L 67/06 370/310 |
| 2008/0026788 | A1 * | 1/2008 | Hamada ............... H04W 72/02 455/552.1 |
| 2008/0045147 | A1 | 2/2008 | Okuda |
| 2008/0113684 | A1 | 5/2008 | Jung et al. |
| 2009/0016232 | A1 | 1/2009 | Kwon, II et al. |
| 2009/0017807 | A1 | 1/2009 | Kwon, II et al. |
| 2009/0073914 | A1 | 3/2009 | Sun et al. |
| 2009/0093266 | A1 * | 4/2009 | Taori et al. ............... 455/509 |
| 2009/0168689 | A1 * | 7/2009 | Itagaki ............... H04W 72/085 370/315 |
| 2009/0168736 | A1 | 7/2009 | Itagaki et al. |
| 2009/0268634 | A1 * | 10/2009 | Mashimo ............... H04W 40/246 370/254 |
| 2009/0285149 | A1 * | 11/2009 | Kwon et al. ............... 370/315 |
| 2009/0290528 | A1 * | 11/2009 | Kwon et al. ............... 370/315 |
| 2009/0325622 | A1 * | 12/2009 | Matsumura et al. ......... 455/522 |
| 2010/0008247 | A1 * | 1/2010 | Kwon ............... H04L 43/0811 370/252 |
| 2010/0142441 | A1 | 6/2010 | Toda et al. |
| 2010/0261469 | A1 | 10/2010 | Ribeiro et al. |

FOREIGN PATENT DOCUMENTS

| | | |
|---|---|---|
| EP | 1998499 A1 | 12/2008 |
| EP | 2076091 A2 | 7/2009 |
| GB | 2316271 A | 2/1998 |
| GB | 2408173 | 5/2005 |
| JP | 2008048202 A | 2/2008 |
| JP | 2008113252 A | 5/2008 |
| KR | 20090080551 A | 7/2009 |
| WO | WO-9904514 A1 | 1/1999 |
| WO | WO-2005067169 A2 | 7/2005 |
| WO | WO-2008069245 A1 | 6/2008 |
| WO | WO-2009008660 A2 | 1/2009 |
| WO | WO-2009008662 A2 | 1/2009 |
| WO | WO2009069091 A1 * | 6/2009 |

OTHER PUBLICATIONS

Hiroyuki Yomo, et al., "A Channel State Estimation Method for Wireless Relay Network" IEEE VTS Vehicular Technology Conference. Proceedings, IEEE, US, Apr. 1, 2007 (Apr. 1, 2007), pp. 1811-1815, XP031092942.

IEEE Standard for Local and metropolitan area networks Part 16, Air Interface for Broadband Wireless Access Systems Amendment 1, Multiple Relay Specification, IEEE Std 802.16j-2009 (Amendment to IEEE Std 802.16/2009), IEEE Standard, IEEE, Piscataway, NJ, USA, Jun. 12, 2009 (Jun. 12, 2009), pp. C1-C290, XP017604214.

International Preliminary Report on Patentability—PCT/US2010/054732, The International Bureau of WIPO—Geneva, Switzerland, dated Jan. 23, 2012.

International Search Report and Written Opinion—PCT/US2010/054732, International Search Authority—European Patent Office—dated Jan. 31, 2011.

Taiwan Search Report—TW099137359—TIPO—dated Jul. 4, 2013.

* cited by examiner

METHOD FOR FORWARDING IN PEER-TO-PEER WIRELESS COMMUNICATIONS

CROSS-REFERENCE

Claim of Priority under 35 U.S.C. § 119

The present application is a continuation application of U.S. patent application Ser. No. 12/619,170, filed on Nov. 16, 2009, titled "METHOD FOR FORWARDING IN PEER-TO-PEER WIRELESS COMMUNICATIONS" which claims the benefit to U.S. Provisional Patent Application No. 61/255,971, filed on Oct. 29, 2009, titled "METHOD FOR FORWARDING IN PEER-TO-PEER WIRELESS COMMUNICATIONS". The entireties of the aforementioned applications are herein incorporated by reference.

FIELD

Certain aspects of the present disclosure generally relate to a wireless communication and, more particularly, to forwarding of data in peer-to-peer transactions by a high-capability wireless device.

BACKGROUND

Handheld/mobile wireless devices often have limited capabilities compared to access points or other high-end devices, e.g., in terms of transmission power and beamforming capability. Furthermore, even if two wireless devices have high capabilities, the network geometry may be such that the path loss and/or shadowing in a link between them are very strong.

Hence, during a peer-to-peer communication between two mobile stations, these peer stations may not have enough resources to form a strong link for high-speed communication. This can be exacerbated in high-frequency links where severe path loss necessitates the use of directional communication.

SUMMARY

Certain aspects provide a method for wireless communications by a source apparatus. The method generally includes exchanging messages with an apparatus capable of forwarding data to a destination apparatus, determining, based on the exchange of messages, whether to send data to the destination apparatus via the forwarding apparatus or to send the data directly to the destination apparatus, and transmitting data to the destination apparatus based on the determination.

Certain aspects provide an apparatus for wireless communications. The apparatus generally includes a transceiver configured to exchange messages with an apparatus capable of forwarding data to a destination apparatus, and a processor configured to determine, based on the exchange of messages, whether to send data to the destination apparatus via the forwarding apparatus or to send the data directly to the destination apparatus, wherein the transceiver is also configured to transmit data to the destination apparatus based on the determination.

Certain aspects provide an apparatus for wireless communications. The apparatus generally includes means for exchanging messages with an apparatus capable of forwarding data to a destination apparatus, means for determining, based on the exchange of messages, whether to send data to the destination apparatus via the forwarding apparatus or to send the data directly to the destination apparatus, and means for transmitting data to the destination apparatus based on the determination.

Certain aspects provide a computer-program product for wireless communications by a source apparatus. The computer-program product includes a computer-readable medium comprising instructions executable to exchange messages with an apparatus capable of forwarding data to a destination apparatus, determine, based on the exchange of messages, whether to send data to the destination apparatus via the forwarding apparatus or to send the data directly to the destination apparatus, and transmit data to the destination apparatus based on the determination.

Certain aspects provide a wireless node. The wireless node generally includes at least one antenna, a transceiver configured to exchange messages via the at least one antenna with another wireless node capable of forwarding data to a destination wireless node, and a processor configured to determine, based on the exchange of messages, whether to send data to the destination wireless node via the forwarding wireless node or to send the data directly to the destination wireless node, wherein the transceiver is also configured to transmit data via the at least one antenna to the destination apparatus based on the determination.

Certain aspects provide a method for wireless communications by a forwarding apparatus. The method generally includes receiving, from a source apparatus, a request message to send data to a destination apparatus, in response to the request message, determining whether it is preferable to send the data from the source apparatus directly to the destination apparatus or to send the data from the source apparatus to the destination apparatus via the forwarding apparatus, and transmitting a confirmation message to the source apparatus and to the destination apparatus, said confirmation message indicating that it is preferable to send the data to the destination apparatus via the forwarding apparatus.

Certain aspects provide an apparatus for wireless communications. The apparatus generally includes a receiver configured to receive, from a source apparatus, a request message to send data to a destination apparatus, a processor configured to determine, in response to the request message, whether it is preferable to send the data from the source apparatus directly to the destination apparatus or to send the data from the source apparatus to the destination apparatus via the apparatus, and a transmitter configured to transmit a confirmation message to the source apparatus and to the destination apparatus, said confirmation message indicating that it is preferable to send the data to the destination apparatus via the apparatus.

Certain aspects provide an apparatus for wireless communications. The apparatus generally includes means for receiving, from a source apparatus, a request message to send data to a destination apparatus, means for determining, in response to the request message, whether it is preferable to send the data from the source apparatus directly to the destination apparatus or to send the data from the source apparatus to the destination apparatus via the apparatus, and means for transmitting a confirmation message to the source apparatus and to the destination apparatus, said confirmation message indicating that it is preferable to send the data to the destination apparatus via the apparatus.

Certain aspects provide a computer-program product for wireless communications by a forwarding apparatus. The computer-program product includes a computer-readable medium comprising instructions executable to receive, from a source apparatus, a request message to send data to a destination apparatus, in response to the request message, determine whether it is preferable to send the data from the source apparatus directly to the destination apparatus or to send the data from the source apparatus to the destination apparatus via the forwarding apparatus, and transmit a confirmation message to the source apparatus and to the destination apparatus, said confirmation message indicating that it is preferable to send the data to the destination apparatus via the forwarding apparatus.

Certain aspects provide a wireless node. The wireless node generally includes at least one antenna, a receiver configured to receive, from a source wireless node via the at least one antenna, a request message to send data to a destination wireless node, a processor configured to determine, in response to the request message, whether it is preferable to send the data from the source wireless node directly to the destination wireless node or to send the data from the source wireless node to the destination wireless node via the wireless node, and a transmitter configured to transmit via the at least one antenna a confirmation message to the source wireless node and to the destination wireless node, said confirmation message indicating that it is preferable to send the data to the destination wireless node via the wireless node.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
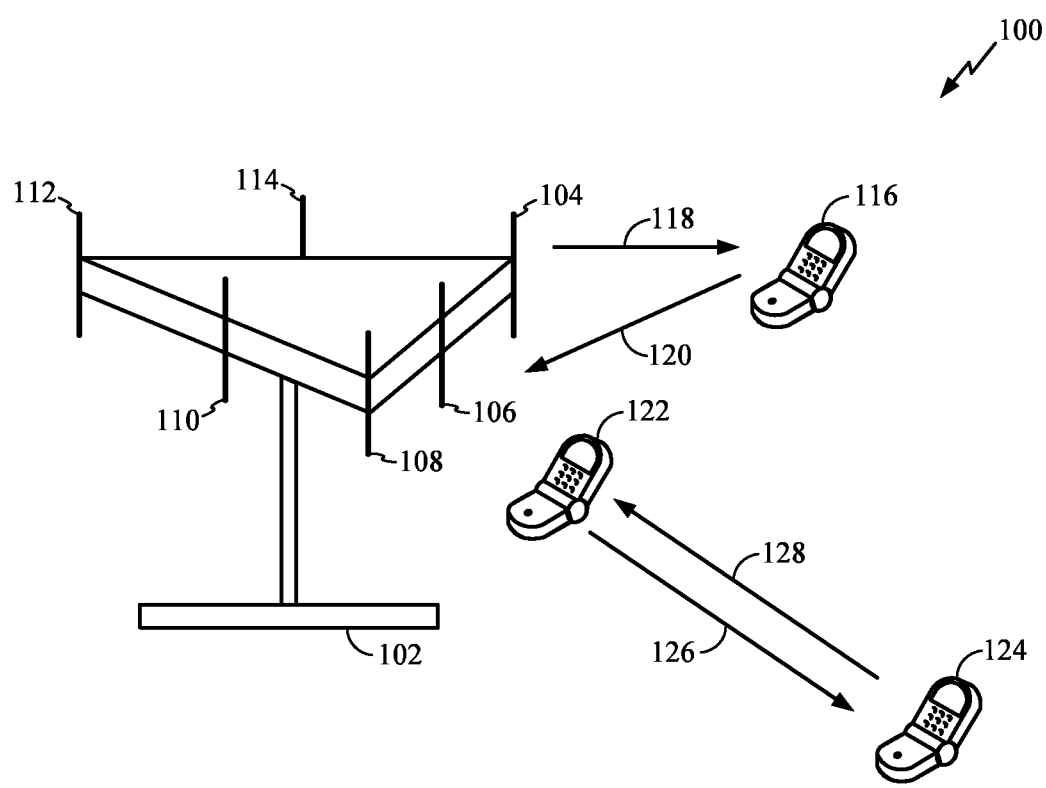
FIG. 1 illustrates an example wireless communication system in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One specific example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

IEEE 802.16x is an emerging standard organization to define an air interface for fixed and mobile broadband wireless access (BWA) systems. IEEE 802.16x approved "IEEE P802.16d/D5-2004" in May 2004 for fixed BWA systems and published "IEEE P802.16e/D12 Oct. 2005" in October 2005 for mobile BWA systems. The latest revision of the IEEE 802.16, "IEEE P802.16Rev2/D8 Dec. 2008," a draft standard, now consolidates materials from IEEE 802.16e and corrigendum. The standards define four different physical layers (PHYs) and one medium access control (MAC) layer. The OFDM and OFDMA physical layer of the four physical layers are the most popular in the fixed and mobile BWA areas respectively.

The teachings herein may be incorporated into (e.g., implemented within or performed by) a variety of wired or wireless apparatuses (e.g., nodes). In some aspects, a node implemented in accordance with the teachings herein may comprise an access point or an access terminal.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, a headset, a sensor or any other suitable device that is configured to communicate via a wireless or wired medium. In some aspects the node is a wireless node. Such wireless node may provide, for example, connectivity for or to a network (e.g., a wide area network such as the Internet or a cellular network) via a wired or wireless communication link.

Referring now to FIG. 1, illustrated is a wireless communication system 100 in accordance with various aspects of the present disclosure. System 100 comprises a base station (i.e., an access point) 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. The base station 102 can additionally include a transmitter chain and a receiver chain, each of which can in turn comprise a plurality of components associated with signal transmission and reception (e.g., processors, modulators, multiplexers, demodulators, demultiplexers, antennas, and so forth), as will be appreciated by one skilled in the art. Additionally, the base station 102 can be a home base station, a Femto base station, and/or the like.

The base station 102 can communicate with one or more devices such as device 116; however, it is to be appreciated that base station 102 can communicate with substantially any number of devices similar to device 116. As depicted, device 116 is in communication with antennas 104 and 106, where antennas 104 and 106 transmit information to device 116 over a forward link 118 and receive information from device 116 over a reverse link 120. In a frequency division duplex (FDD) system, forward link 118 can utilize a different frequency band than that used by reverse link 120, for example. Further, in a time division duplex (TDD) system, forward link 118 and reverse link 120 can utilize a common frequency band.

In addition, devices 122 and 124 can be communicating with one another, such as in a peer-to-peer configuration. Moreover, device 122 is in communication with device 124 using links 126 and 128. In a peer-to-peer ad hoc network, devices within range of each other, such as devices 122 and 124, communicate directly with each other without a base station 102 and/or a wired infrastructure to relay their communication. Additionally, peer devices or nodes can relay traffic. The devices within the network communicating in a peer-to-peer manner can function similar to base stations and relay traffic or communications to other devices, functioning similar to base stations, until the traffic reaches its ultimate destination. The devices can also transmit control channels, which carry information that can be utilized to manage the data transmission between peer nodes.

A communication network can include any number of devices or nodes that are in wireless (or wired) communication. Each node can be within range of one or more other nodes and can communicate with the other nodes or through utilization of the other nodes, such as in a multi-hop topography (e.g., communications can hop from node to node until reaching a final destination). For example, a sender node may wish to communicate with a receiver node. To enable packet transfer between sender node and receiver node, one or more intermediate nodes can be utilized. It should be understood that any node can be a sender node and/or a receiver node and can perform functions of either sending and/or receiving information at substantially the same time (e.g., can broadcast or communicate information at about the same time as receiving information) or at different times.

System 100 can be configured to allow nodes that have initiated a communication session over a network to move the session to a direct connection. Nodes that are directly connected can exchange packets natively without any encapsulation. In accordance with some aspects, a "homeless" node can switch to a wireless network without losing its ongoing sessions. By "homeless" it is meant a node that does not have any home agent entity to provide assistance for keeping ongoing sessions alive while switching to foreign networks nor to forward any new incoming request(s) to establish new sessions to the node's current location. In accordance with some aspects, nodes can be mobile (e.g., wireless), static (e.g., wired), or combinations thereof (e.g., one node static and a second node mobile, both nodes mobile, and so forth).

Figure 2:
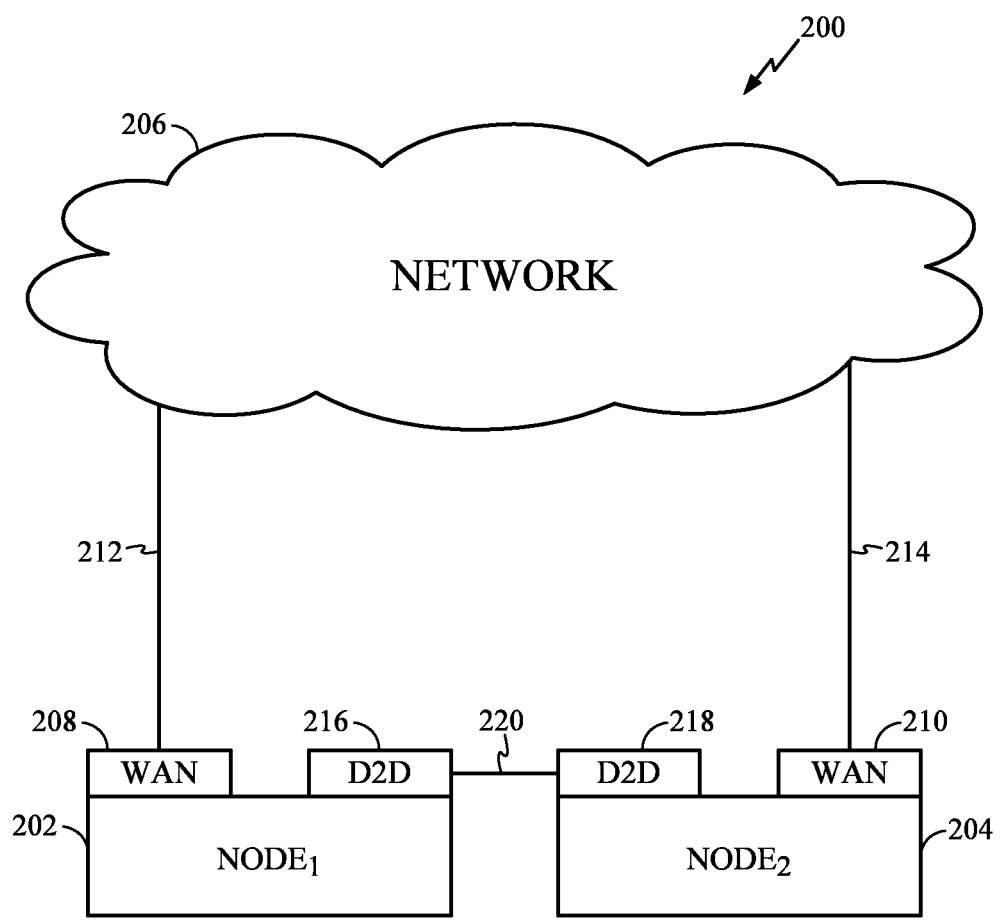
FIG. 2 illustrates a system that allows two nodes to communicate in accordance with certain aspects of the present disclosure.

FIG. 2 illustrates a system 200 that allows two nodes to communicate over a Wide Area Network interface and/or a Device to Device interface, according to various aspects. Included in the system 200 are a first node (Node$_1$) 202 and a second node (Node₂) 204. Each node 202, 204 includes at least two interfaces. A first interface can be connected to a network 206 that provides Internet Protocol (IP) addresses. For example, the network can be a Wide Area Network (WAN), a Local Area Network (LAN), a home network, Digital Subscriber Line (DSL), cable, 3GPP based, 3GPP2 based, or any other technology providing interconnectivity and routing to a network of interest (e.g., the Internet).

Interfaces of nodes 202 and 204 can be wired (e.g., Device to Device), wireless (e.g., WAN), or combinations thereof. For example, Node₁ interface can be wireless and Node₂ interface can be wired, or Node₂ interface can be wireless and Node₁ interface can be wired, both interfaces can be wireless, or both interfaces can be wired.

For illustration purposes, the first interface of each node 202, 204 is a WAN interface, 208 and 210. WAN interfaces 208, 210 provide a connection over network 206, illustrated by links 212 and 214. Further, each node 202, 204 includes at least a second interface that is connected to a local network with directly connected peers or a multi-hop mesh network. For example, the local network can be a Wireless Local Area Network (WLAN) or another device to device (e.g., peer to peer) technology. For illustration purposes, the second interface of each node 202, 204 is illustrated as a Device to Device (D2D) interface 216, 218. The D2D interfaces 216, 218 allow nodes 202, 204 to perform direct communications, illustrated by direct link 220.

A procedure according to various aspects for starting a session over network 206 and moving to a direct session (e.g., over direct link 220) will now be described. For example purposes, it is assumed that Node₁ 202 utilizes Mobile Internet Protocol. Communications are performed by Node₁ 202 utilizing its Mobile IP home address as a source address. A home address is a unicast routable address assigned to a node and is used as the permanent address of the node. Node₁ 202 communicates with Node₂ 204 over network 206 (e.g., WAN) by sending and receiving packets over respective first interfaces (e.g., WAN interfaces 208, 210). The packets can be encapsulated in a MIPv6 tunnel to a home agent, which can be included in network 206 according to various aspects, or a route optimization tunnel directly to Node₂ 204.

Figure 3:
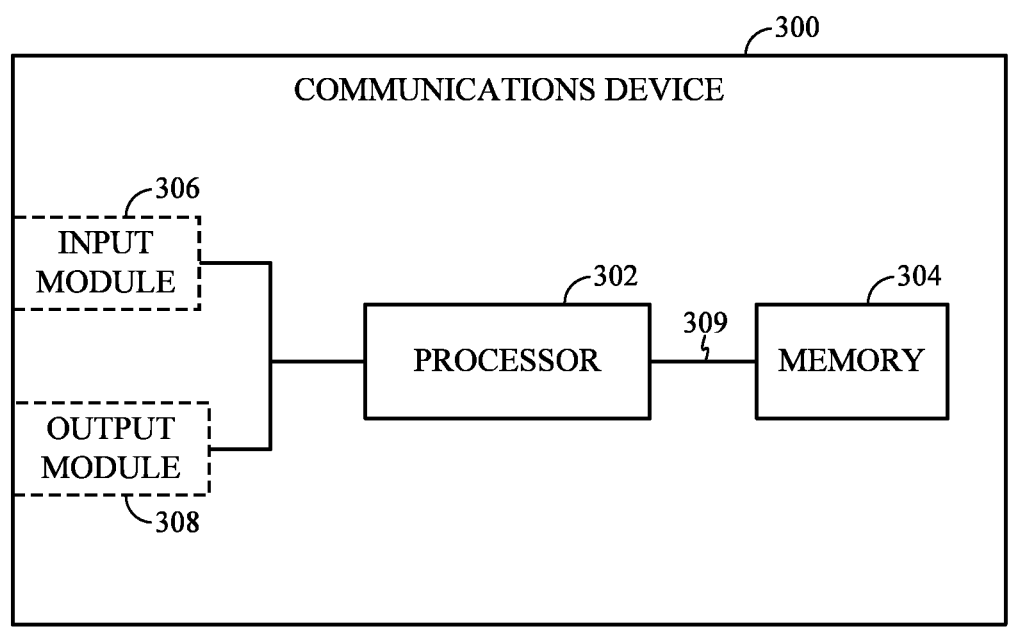
FIG. 3 illustrates an example of a communication device in accordance with certain aspects of the present disclosure.

FIG. 3 illustrates an exemplary first communications device 300, in accordance with an exemplary aspect. Exemplary first communications device 300 is, e.g., one of the wireless communications devices (102, 116, 122, 124) of FIG. 1 or one of the wireless communications devices (202, 204) of FIG. 2.

First communications device 300 includes a processor 302 and memory 304 coupled together via a bus 309 over which the various elements (302, 304) may interchange data and information. Communications device 300 further includes an input module 306 and an output module 308 which may be coupled to processor 302 as shown. However, in some aspects, the input module 306 and output module 308 are located internal to the processor 302. Input module 306 can receive input signals. Input module 306 can, and in some aspects does, include a wireless receiver and/or a wired or optical input interface for receiving input. Output module 308 may include, and in some aspects does include, a wireless transmitter and/or a wired or optical output interface for transmitting output.

Processor 302 is configured to: receive a first signal from a second communications device; generate a first application alert if said first signal satisfies an application alert criteria; and receive a second signal from an access point said second signal carrying second communications device information based on a previous signal from the second communications device. The access point may be, and sometimes is, a base station. In some aspects, the second communications device information is location information. In various aspects, processor 302 is configured to receive said first signal via a wireless peer to peer interface as part of being configured to receive a first signal. In some aspects, processor 302 is configured to receive the second signal via a wireless wide area network interface as part of being configured to receive the second signal.

Processor 302 is further configured to determine an operation to take based on the second communications device information included in the second signal and information included in said first signal. In one exemplary aspect, said second communications device information included in the second signal is information on a previous location of said second communications device, said information included in the first signal is current location information, and said operation is one of a location based traffic update operation and a location based advertisement update operation. Processor 302, in some aspects, is further configured to send an information request signal to the access point requesting information corresponding to the second communications device, in response to the generated first application alert.

Certain aspects of the present disclosure support the mechanism for an access point (AP), such as the AP 102 from FIG. 1, or another high-capability wireless device to forward traffic from one device (i.e., peer) to another, such as from the device 122 to the device 124. Criteria are also proposed in the present disclosure to decide when forwarding via the AP is advantageous over direct peer-to-peer communication.

Problem Setting

Due to the severe path loss in high frequency wireless networks, such as those operating in the 60 GHz band, these systems are expected to rely heavily on directional communication. According to the Friis equation:

$$P_{RX} = \frac{G_{TX} G_{RX} c^2}{(4\pi d)^2 f_c^2} \times \frac{1}{\sigma \cdot N_f} P_{TX}, \tag{1}$$

the received power (and hence the received signal-to-noise ratio (SNR)) may be proportional to the product of antenna gains at a transmitter and a receiver, $G_{TX}$ and $G_{RX}$, respectively. $P_{TX}$ in equation (1) denotes a transmission power, d is a distance between the transmitter and receiver, c is a speed of a transmission signal, and $f_c$ is a carrier frequency.

Having a plugged-in power supply and the ability to support higher processing power (compared to mobile and handheld devices) makes it possible for the APs to use large arrays of antennas. Such APs may obtain very large antenna gains when using beamforming to steer a narrow beam towards a user station (STA). On the other hand, cost, space and power limitations may prevent handheld and/or portable STAs from having many antenna elements, or using complicated beamforming algorithms.

When a handheld STA communicates with an AP, a relatively small antenna gain of the STA in equation (1) may be compensated by a high antenna gain of the AP. However, when two handheld STAs with limited beamforming capabilities communicate directly in a peer-to-peer manner, the resulting weak link budget may severely limit the throughput of the STA-to-STA link. Furthermore, each of the two STAs may be more likely to have a line of sight (LOS) path to the AP, since APs may be mounted on higher points such as the ceiling, while the direct path between the two STAs may be obstructed by an obstacle, such as a wall or smaller objects. An example of such scenarios is in an office space with cubicles, where the STAs often do not mutually have a LOS, while each of them may have a LOS to the AP installed on the ceiling.

In another scenario, two STAs may be located at two far ends of a wireless network, such that the path loss between them may be too strong to perform high-throughput communication. A third STA, possible the AP, may be positioned such that the path loss from each of the two stations to the third station may be much smaller than the path loss between the two STAs. An example of such a situation is a home network in a house, where the set-up box and the TV may be placed in the two far ends of the house, but there may be an AP midway between them.

In the abovementioned scenarios, the link between two STAs may have a significantly lower capacity than that between the AP/third STA and each of the two STAs. Hence, when the two STAs need to communicate, it may be more beneficial for the AP/third STA to forward the traffic between them, instead of the two STAs communicating directly.

Criteria for Forwarding of Peer-to-Peer Traffic

Figure 4:
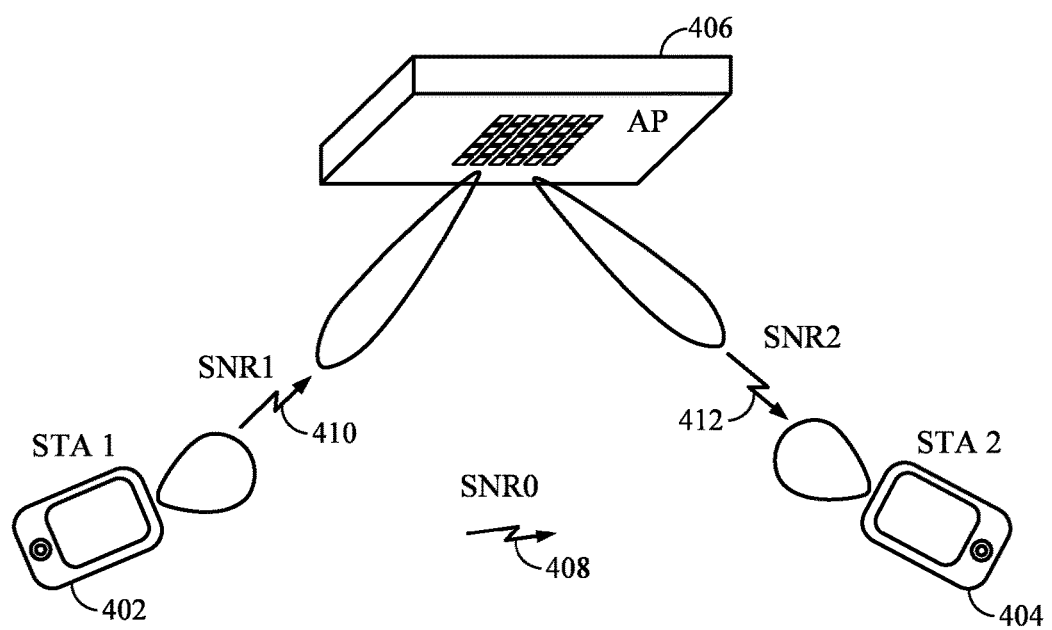
FIG. 4 illustrates an example wireless network with wide beam patterns at mobile stations (STAs) and antenna arrays with fine beam patterns at an access point (AP) in accordance with certain aspects of the present disclosure.

FIG. 4 illustrates an example wireless network with wide beam patterns at mobile stations and antenna arrays with fine beam patterns at an access point (AP) in accordance with certain aspects of the present disclosure. A station (STA) 402 may intend to transmit data to another STA 404. The signal-to-noise ratio (SNR) observed at a direct link 408 from the STA 402 to the STA 404 can be denoted by $SNR_0$, and the SNRs observed at a link 410 from the STA 402 to the AP 406 and at a link 412 from the AP 406 to the STA 404 can be denoted respectively by $SNR_1$ and $SNR_2$, defined per complex dimension. At each of these links, the best possible transmit and receive beam patterns may be utilized.

Several conditions may be met, such as: $SNR_0$ may be too low to support a high throughput transmission from the STA 402 to the STA 404, $SNR_1$ and $SNR_2$ may be both much higher than $SNR_0$, and the traffic may tolerate the additional latency of communicating through the AP 406. In this case, the STA 402 may transmit data to the AP 406 instead of sending them directly to the STA 404, and then the AP 406 may forward the data to the STA 404.

Through earlier negotiations, the AP 406 and/or the STA 402 may be aware of the values of $SNR_0$, $SNR_1$, and $SNR_2$. Furthermore, the channels may be relatively stationary, such that the SNRs do not vary significantly during the intended communication. Using Shannon's formula for the capacity of an Additive White Gaussian Noise (AWGN) channel, the spectral efficiency of the complex channels 408, 410, and 412 may be denoted respectively by $C_0$, $C_1$, and $C_2$, and computed as:

$$C_i = \log_2(1 + SNR_i) \text{ bits/sec/Hz} \quad (2)$$

During the forwarding, successful transmission of a data packet from the STA 402 to the AP 406 may need to be completed before it is forwarded from the AP 406 to the STA 404. Furthermore, the transmitted data packets may be long, so that the channel time used for the transmission may be proportional to the packet length, rather than being dominated by the overheads, processing times and signal travel time between the transmitter and the receiver.

The channel time used for transmitting a data packet through a channel with capacity $C_i$ may be approximated as:

$$T_i = \frac{\alpha}{C_i}, \quad (3)$$

where $\alpha$ is a constant which is a function of the packet length and system specifications. In order to decide whether AP forwarding is beneficial, a total channel time used by direct transmission $T_D$ may be compared versus a channel time used for forwarding $T_{FW}$. By combining equations (2) and (3), $T_D$ and $T_{FW}$ may be estimated as:

$$T_D = \frac{\alpha}{\log(1 + SNR_0)}, \quad (4)$$

$$T_{FW} = \frac{\alpha}{\log(1 + SNR_1)} + \frac{\alpha}{\log(1 + SNR_2)}.$$

Furthermore, since the list of possible modulation and coding schemes (MCSs) are often defined by a wireless standard, the minimum SNR value required for successful transmission of the data packet using the most reliable MCS among the defined MCSs may need to be considered. This particular SNR value can be denoted by $SNR_{min}$.

By summarizing the discussion above, a protocol is proposed for the AP (or for the other high capability device) to decide between direct transmission and AP forwarding. The AP (e.g., the AP 406 from FIG. 4) may first obtain SNR values $SNR_0$, $SNR_1$, and $SNR_2$ of the links 408, 410, and 412, respectively. If $SNR_0 < SNR_{min}$, but $SNR_1 > SNR_{min}$ and $SNR_2 > SNR_{min}$, then the AP forwarding may be chosen. If $SNR_0 > SNR_{min}$, but either $SNR_1 < SNR_{min}$ or $SNR_2 < SNR_{min}$, then the direct transmission from the STA 402 to the STA 404 may be selected. If $SNR_0 < SNR_{min}$, $SNR_1 < SNR_{min}$, and $SNR_2 < SNR_{min}$, then reliable transmission may not be possible using either scheme. If:

$$\frac{T_D}{\alpha} = \frac{1}{\log(1 + SNR_0)} \leq \frac{1}{\log(1 + SNR_1)} + \frac{1}{\log(1 + SNR_2)} = \frac{T_{FW}}{\alpha}, \quad (5)$$

then the direct communication may be chosen. Otherwise, the AP forwarding may be selected.

Protocol for Forwarding of Peer-to-Peer Traffic

AP forwarding capability may be announced periodically by an AP using an information element (IE) within a beacon or within other control messages. Forwarding capable STA may announce the forwarding capability in its association messages. The decision for considering the AP forwarding as an option may be taken by the higher layer sections of the source STA (e.g., the STA 402 from FIG. 4) or the AP, based on the link quality, traffic type and other considerations. The forwarding process may be mostly transparent to the Physical layer (PHY) and Media Access Control (MAC) layer of a destination STA (e.g., the STA 404 from FIG. 4). The STA 404 may perform its reception and acknowledgement as though it is communicating only with the AP.

Once either the STA 402 or the AP 406 decides to consider AP forwarding as an option and if all the involving STAs support AP forwarding, then the following protocol can be utilized to perform data communication between two peer stations. When the STA 402 decides to consider AP forwarding as an option, it may send a forwarding request message to the AP 406. In one aspect of the present disclosure, the STA 402 may transmit the forwarding request message using its preferred antenna pattern. This request may also contain various traffic parameters. In another aspect of the present disclosure, the STA 402 may send the forwarding request to both the AP 406 and the STA 404 by using its omni beam. The AP 406 may acknowledge the receipt and acceptance of the forwarding request by sending an AP forwarding request acknowledgement to the STA 402.

The AP 406 may perform the previously proposed method to decide whether the AP forwarding is preferable to direct communication between the STA 402 and the STA 404. If the direct communication is preferable, then the AP 406 may transmit an AP forwarding denial message to the STA 402, and the forwarding protocol may be terminated. On the other hand, if the AP forwarding is chosen by the AP 406, then the AP may transmit an AP forwarding confirmation message to the STA 402 and to the STA 404, announcing that the AP may forward some traffic from the STA 402 to the STA 404.

In one aspect of the present disclosure, the AP 406 may assign channel times for the STA 402 to transmit some of its packets to the AP 406, as well as other channel times for the STA 404 to receive the forwarded packets from the AP 406. In another aspect, the AP 406 may assign particular frequency bands for data transmission between the STA 402 and the AP 406, and other possibly different frequency bands for data reception at the STA 404. In yet another aspect, the AP 406 may allocate a set of spatial channels for data transmission between the STA 402 and the AP 406, and another set of spatial channels for forwarding data from the AP 406 to the STA 404.

The forwarding may be performed in one hop, i.e., the STA 402 may send all the data, the AP 406 may receive and buffer them, and then the AP 406 may forward all of the data to the STA 404. Alternatively, the forwarding may be performed in multiple hops, i.e., data packets may be transmitted and forwarded in multiple cycles.

In one aspect of the present disclosure, the AP 406 may decode the entire data packet received from the STA 402, then re-encode it, and finally transmit it to the STA 404. During the re-encoding, some changes to a header of the data packet may be applied. In another aspect, the AP 406 may decode only a part (e.g., a header) of the data packet received from the STA 402. The decoded part may be then re-encoded, possibly with some changes applied to its content. A rest of the packet (i.e., a part of the packet that is not decoded) may be only down-converted and then up-converted at the AP 406 before being forwarded to the STA 404. This remaining part of the packet may be transmitted from the AP 406 to the STA 404 together with the re-encoded part of the packet.

In yet another aspect of the present disclosure, the AP 406 may forward the data packet received from the STA 402 without decoding and re-encoding any portion of the packet. Instead, the AP 406 may only up-convert the received down-converted data samples, and then transmit them to the STA 404. The data transmission from the AP 406 to the STA 404 may be performed in real time (i.e., simultaneously with the reception of data at the AP 406 with a defined small delay). Alternatively, the data transmission from the AP 406 to the STA 404 may be performed in a separate time period from the data reception at the AP 406. In this case, the entire packet may be first buffered at the AP 406 before being forwarded to the STA 404.

The acknowledgement process of each packet may be completed between the AP 406 and the STA 402, similar to a regular data exchange, before the packet is being forwarded to the STA 404. Similarly, the STA 404 may perform its acknowledgement process with the AP 406, and not with the STA 402. Certain aspects of the present disclosure support that the acknowledgement from the STA 404 is being forwarded to the STA 402 by the AP 406. This may remove the requirement of buffering the packets at the AP 406 received from the STA 402.

In one aspect of the present disclosure, the AP 406 may inform at least one STA is the network, including the STA 402, of channel conditions of links between the AP 406 and a plurality of STAs in the network. Therefore, the AP 406 may inform the STA 402 about channel condition of the link between the AP 406 and the STA 402, as well as about channel condition of the link between the AP 406 and the STA 404. Based on this information and known channel condition of the direct link between the STA 402 and the STA 404, the STA 402 may determine whether it is preferable to send the data to the STA 404 via the AP 406 or to send the data directly to the STA 404.

Based on this determination, the STA 402 may decide to send the data to the STA 404 via the AP 406. In this case, the STA 402 may send a request or an announcement message to the AP 406 about the decision. The announcement message may be embedded in the data to be forwarded to the STA 404 by the AP 406. Alternatively, instead of sending the additional message about the decision to send the data to the STA 404 via the AP 406, the STA 402 may include an indication within the data that final destination for the data is the STA 404. The indication may comprise an address of the STA 404. Once receiving the data, the AP 406 may know to forward the received data to the STA 404 based on the indication embedded in the received data.

Figure 5:
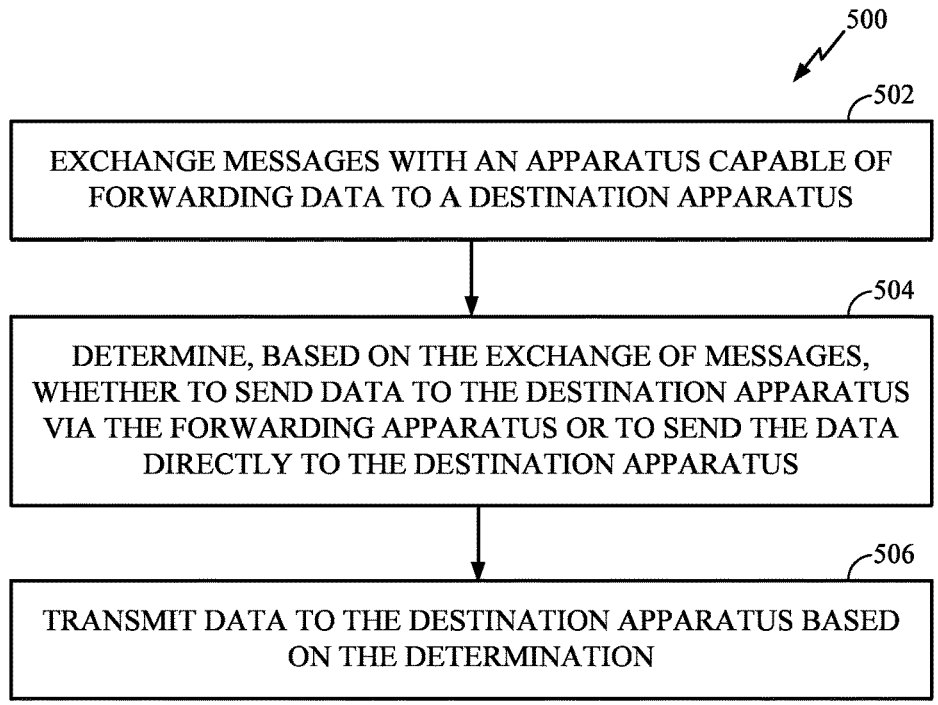
FIG. 5 illustrates example operations executed at a STA which may transmit data to the AP to be forwarded to another STA in accordance with certain aspects of the present disclosure.

FIG. 5 illustrates example operations 500 executed at a source apparatus that may transmit data to an apparatus capable of forwarding data to a destination apparatus in accordance with certain aspects of the present disclosure. The source apparatus may be the STA 402 from FIG. 4, the forwarding apparatus may be the AP 406 and the destination apparatus may be the STA 404. At 502, the source apparatus may exchange messages with the forwarding apparatus. At 504, it may be determined, based on the exchange of messages, whether to send data to the destination apparatus via the forwarding apparatus or to send the data directly to the destination apparatus. At 506, the source apparatus may transmit data to the destination apparatus based on the determination.

In one aspect of the present disclosure, the exchanging of messages may comprise exchanging one or more messages indicating directional capability of the forwarding apparatus and directional capability of the source apparatus. Then, based on the directional capability of the forwarding apparatus and the directional capability of the source apparatus, it may be determined (either at the forwarding apparatus or at the source apparatus) whether it is preferable to forward the data to the destination apparatus via the forwarding apparatus or to send the data directly to the destination apparatus.

In another aspect of the present disclosure, the exchanging of messages may comprise exchanging one or more messages indicating a transmission power of the forwarding apparatus and a transmission power of the source apparatus. Then, based on the transmission power of the forwarding apparatus and the transmission power of the source apparatus, it may be determined (either at the forwarding apparatus or at the source apparatus) whether it is preferable to forward the data to the destination apparatus via the forwarding apparatus or to send the data directly to the destination apparatus.

In yet another aspect of the present disclosure, the exchanging of messages may comprise exchanging one or more messages indicating one or more beamforming gains of the forwarding apparatus and of the source apparatus. Then, based on the one or more beamforming gains of the forwarding apparatus and of the source apparatus, it may be determined (either at the forwarding apparatus or at the source apparatus) whether it is preferable to forward the data to the destination apparatus via the forwarding apparatus or to send the data directly to the destination apparatus.

Figure 6:
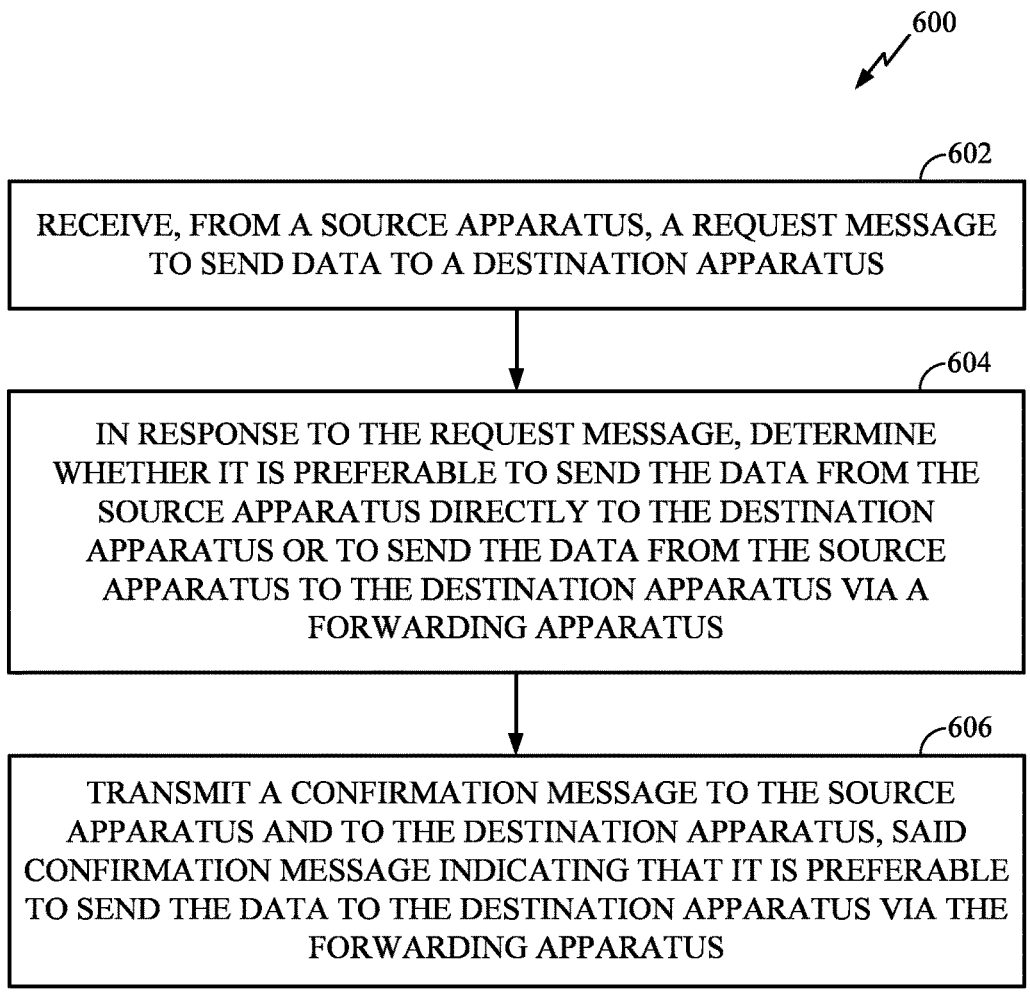
FIG. 6 illustrates example operations executed at the AP which may forward the data received from the STA to the other STA in accordance with certain aspects of the present disclosure.

FIG. 6 illustrates example operations 600 executed at the forwarding apparatus which may forward the data from the source apparatus to the destination apparatus in accordance with certain aspects of the present disclosure. At 602, the forwarding apparatus may receive from the source apparatus a request message to send the data to the destination apparatus. At 604, in response to the request message, the forwarding apparatus may determine whether it is preferable to send the data from the source apparatus directly to the destination apparatus or to send the data from the source apparatus to the destination apparatus via the forwarding apparatus. At 606, the forwarding apparatus may transmit a confirmation message to the source apparatus and to the destination apparatus, said confirmation message indicating that it is preferable to send the data to the destination apparatus via the forwarding apparatus. In response to the confirmation message, the source apparatus may transmit the data to the forwarding apparatus, and then the data may be forwarded from the forwarding apparatus to the destination apparatus.

Figure 5A:
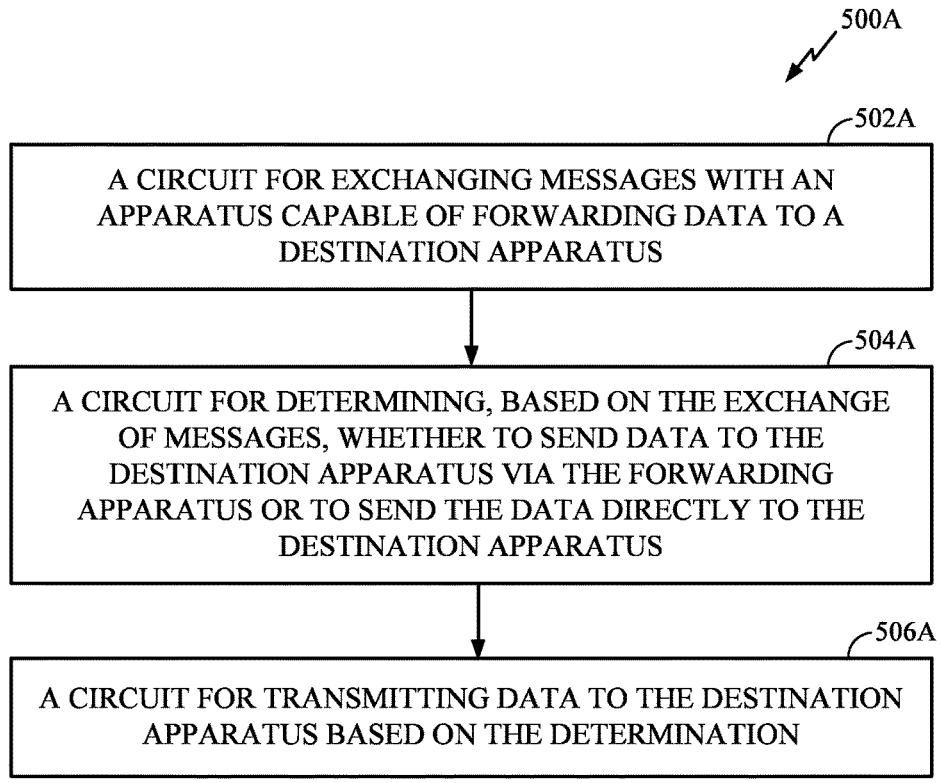
FIG. 5A illustrates example components capable of performing the operations illustrated in FIG. 5.
Figure 6A:
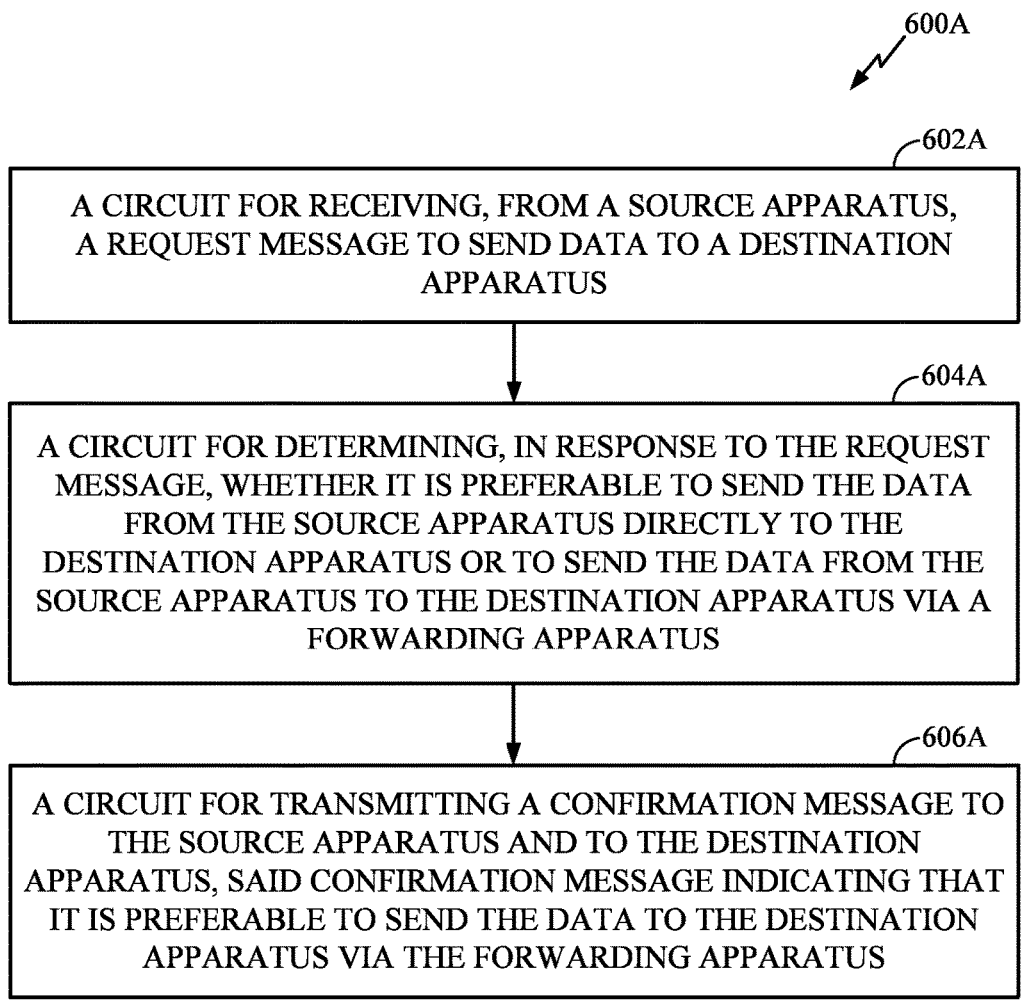
FIG. 6A illustrates example components capable of performing the operations illustrated in FIG. 6.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, blocks 502-506 and 602-606 illustrated in FIG. 5 and FIG. 6, correspond to circuit blocks 502A-506A and 602A-606A illustrated in FIG. 5A and FIG. 6A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to embodiments of the present disclosure, other and further embodiments of the disclosure may be devised without departing from the basic scope thereof, and the scope thereof is determined by the claims that follow.

The invention claimed is:

1. A method for wireless communications by a forwarding apparatus, comprising:
announcing, within an association message, capability of the forwarding apparatus to forward data from a source apparatus to a destination apparatus;
receiving a forwarding request message from the source apparatus based on the association message;
determining, upon receiving the forwarding request message, based on a quality of a first link between the source apparatus and the forwarding apparatus, a quality of a second link between the forwarding apparatus and the destination apparatus, and a quality of a third link between the source apparatus and the destination apparatus, whether it is preferable to send the data from the source apparatus directly to the destination apparatus or to send the data from the source apparatus to the destination apparatus via the forwarding apparatus, comprising determining it is preferable to send the data from the source apparatus to the destination apparatus via the forwarding apparatus if the quality of the first link is above a threshold, the quality of the second link is above the threshold, and the quality of the third link is below the threshold; and
transmitting, in response to the forwarding request message, a forwarding confirmation message to the source apparatus based on the determination.

2. The method of claim 1, further comprising determining, based on types of traffic associated with at least one of the source apparatus, the forwarding apparatus or the destination apparatus, whether it is preferable to send the data to the destination apparatus via the forwarding apparatus or to send the data directly to the destination apparatus.

3. The method of claim 1, further comprising transmitting, in response to the forwarding request message, a forwarding request acknowledgement indicating receipt and acceptance of the forwarding request message.

4. A method for wireless communication by a forwarding apparatus, comprising:
announcing, within an association message, capability of the forwarding apparatus to forward data from a source apparatus to a destination apparatus;
receiving a forwarding request message from the source apparatus based on the association message;
determining, upon receiving the forwarding request message, based on a quality of a first link between the source apparatus and the forwarding apparatus, a quality of a second link between the forwarding apparatus and the destination apparatus, and a quality of a third link between the source apparatus and the destination apparatus, whether it is preferable to send the data from the source apparatus directly to the destination apparatus or to send the data from the source apparatus to the destination apparatus via the forwarding apparatus, comprising determining, upon receiving the forwarding request message, it is preferable to send the data from the source apparatus directly to the destination apparatus if the quality of the first link is below a threshold, the quality of the second link is below the threshold, and the quality of the third link is above the threshold; and
transmitting, in response to the forwarding request message based on the determination, a forwarding denial message to the source apparatus.

5. The method of claim 1, further comprising performing the determination of whether it is preferable to send the data from the source apparatus directly to the destination apparatus or to send the data from the source apparatus to the destination apparatus via the forwarding apparatus by higher layer sections of the forwarding apparatus.

6. An apparatus for wireless communications, comprising:
a transceiver configured to:
transmit, within an association message, an announcement about capability of the apparatus to forward data from a source apparatus to a destination apparatus; and
receive a forwarding request message from the source apparatus based on the association message; and
a processor configured to determine, upon receiving the forwarding request message, based on a quality of a first link between the source apparatus and the apparatus, a quality of a second link between the apparatus and the destination apparatus, and a quality of a third link between the source apparatus and the destination apparatus, whether it is preferable to send the data from the source apparatus directly to the destination apparatus or to send the data from the source apparatus to the destination apparatus via the apparatus, comprising determining it is preferable to send the data from the source apparatus to the destination apparatus via the apparatus if the quality of the first link is above a threshold, the quality of the second link is above the threshold, and the quality of the third link is below the threshold, wherein
the transceiver is also configured to transmit, in response to the forwarding request message, a forwarding confirmation message to the source apparatus based on the determination.

7. The apparatus of claim 6, wherein the processor is also configured to determine, based on types of traffic associated with at least one of the source apparatus, the apparatus or the destination apparatus, whether it is preferable to send the data to the destination apparatus via the apparatus or to send the data directly to the destination apparatus.

8. The apparatus of claim 6, wherein the transceiver is also configured to transmit, in response to the forwarding request message, a forwarding request acknowledgement indicating receipt and acceptance of the forwarding request message.

9. An apparatus for wireless communications, comprising:
a transceiver configured to:
transmit, within an association message, an announcement about capability of the apparatus to forward data from a source apparatus to a destination apparatus; and
receive a forwarding request message from the source apparatus based on the association message; and
a processor configured to determine, upon receiving the forwarding request message, based on a quality of a first link between the source apparatus and the apparatus, a quality of a second link between the apparatus and the destination apparatus, and a quality of a third link between the source apparatus and the destination apparatus, whether it is preferable to send the data from the source apparatus directly to the destination apparatus or to send the data from the source apparatus to the destination apparatus via the apparatus, comprising determining, upon receiving the forwarding request message, it is preferable to send the data from the source apparatus directly to the destination apparatus if the quality of the first link is below a threshold, the quality of the second link is below the threshold, and the quality of the third link is above the threshold; wherein:
the transceiver is also configured to transmit, in response to the forwarding request message based on the determination, a forwarding denial message to the source apparatus.

10. The apparatus of claim 6, wherein higher layer sections of the apparatus are configured to perform the determination of whether it is preferable to send the data from the source apparatus directly to the destination apparatus or to send the data from the source apparatus to the destination apparatus via the forwarding apparatus.

11. An apparatus for wireless communications, comprising:
means for announcing, within an association message, capability of the apparatus to forward data from a source apparatus to a destination apparatus;
means for receiving a forwarding request message from the source apparatus based on the association message;
means for determining, upon receiving the forwarding request message, based on a quality of a first link between the source apparatus and the apparatus, a quality of a second link between the apparatus and the destination apparatus, and a quality of a third link between the source apparatus and the destination apparatus, whether it is preferable to send the data from the source apparatus directly to the destination apparatus or to send the data from the source apparatus to the destination apparatus via the apparatus, comprising means for determining, upon receiving the forwarding request message, it is preferable to send the data from the source apparatus to the destination apparatus via the apparatus if the quality of the first link is above a threshold, the quality of the second link is above the threshold, and the quality of the third link is below the threshold; and
means for transmitting, in response to the forwarding request message, a forwarding confirmation message to the source apparatus based on the determination.

12. The apparatus of claim 11, further comprising means for determining, based on types of traffic associated with at least one of the source apparatus, the apparatus or the destination apparatus, whether it is preferable to send the data to the destination apparatus via the apparatus or to send the data directly to the destination apparatus.

13. The apparatus of claim 11, wherein the means for transmitting is further configured to transmit, in response to the forwarding request message, a forwarding request acknowledgement indicating receipt and acceptance of the forwarding request message.

14. An apparatus for wireless communication, comprising:
means for announcing, within an association message, capability of the apparatus to forward data from a source apparatus to a destination apparatus;
means for receiving a forwarding request message from the source apparatus based on the association message;
means for determining, upon receiving the forwarding request message, based on a quality of a first link between the source apparatus and the apparatus, a quality of a second link between the apparatus and the destination apparatus, and a quality of a third link between the source apparatus and the destination apparatus, whether it is preferable to send the data from the source apparatus directly to the destination apparatus or to send the data from the source apparatus to the destination apparatus via the apparatus, comprising means for determining, upon receiving the forwarding request message, it is preferable to send the data from the source apparatus directly to the destination apparatus if the quality of the first link is below a threshold, the quality of the second link is below the threshold, and the quality of the third link is above the threshold; and
means for transmitting, in response to the forwarding request message based on the determination, a forwarding denial message to the source apparatus.

15. The apparatus of claim 11, further comprising means for performing the determination of whether it is preferable to send the data from the source apparatus directly to the destination apparatus or to send the data from the source apparatus to the destination apparatus via the forwarding apparatus by higher layer sections of the apparatus.

16. A non-transitory computer-readable medium having instructions stored thereon and executable by a computer to:
announce, within an association message, capability of a forwarding apparatus to forward data from a source apparatus to a destination apparatus;
receive a forwarding request message from the source apparatus based on the association message;
determine, upon receiving the forwarding request message, based on a quality of a first link between the source apparatus and the forwarding apparatus, a quality of a second link between the forwarding apparatus and the destination apparatus, and a quality of a third link between the source apparatus and the destination apparatus, whether it is preferable to send the data from the source apparatus directly to the destination apparatus or to send the data from the source apparatus to the destination apparatus via the forwarding apparatus, comprising determining it is preferable to send the data from the source apparatus to the destination apparatus via the forwarding apparatus if the quality of the first link is above a threshold, the quality of the second link is above the threshold, and the quality of the third link is below the threshold; and transmit, in response to the forwarding request message, a forwarding confirmation message to the source apparatus based on the determination.

17. A wireless node, comprising:

at least one antenna;

a transceiver configured to:
  transmit, within an association message via the at least one antenna, an announcement about capability of the wireless node to forward data from a source wireless node to a destination wireless node; and
  receive, via the at least one antenna, a forwarding request message from the source wireless node based on the association message; and a processor configured to determine, upon receiving the forwarding request message, based on a quality of a first link between the source wireless node and the wireless node, a quality of a second link between the wireless node and the destination wireless node, and a quality of a third link between the source wireless node and the destination wireless node, whether it is preferable to send the data from the source wireless node directly to the destination wireless node or to send the data from the source wireless node to the destination wireless node via the wireless node, comprising determining it is preferable to send the data from the source wireless node to the destination wireless node via the wireless node if the quality of the first link is above a threshold, the quality of the second link is above the threshold, and the quality of the third link is below the threshold, wherein:

the transceiver is also configured to transmit, in response to the forwarding request message, a forwarding confirmation message, via the at least one antenna, to the source wireless node based on the determination.

18. A non-transitory computer-readable medium having instructions stored thereon and executable by a computer to:
  announce, within an association message, capability of a forwarding apparatus to forward data from a source apparatus to a destination apparatus;
  receive a forwarding request message from the source apparatus based on the association message;
  determine, upon receiving the forwarding request message, based on a quality of a first link between the source apparatus and the forwarding apparatus, a quality of a second link between the forwarding apparatus and the destination apparatus, and a quality of a third link between the source apparatus and the destination apparatus, whether it is preferable to send the data from the source apparatus directly to the destination apparatus or to send the data from the source apparatus to the destination apparatus via the forwarding apparatus, comprising determining, upon receiving the forwarding request message, it is preferable to send the data from the source apparatus directly to the destination apparatus if the quality of the first link is below a threshold, the quality of the second link is below the threshold, and the quality of the third link is above the threshold; and
  transmit, in response to the forwarding request message based on the determination, a forwarding denial message to the source apparatus.

19. A wireless node, comprising:

at least one antenna;

a transceiver configured to:
  transmit, within an association message via the at least one antenna, an announcement about capability of the wireless node to forward data from a source wireless node to a destination wireless node; and
  receive, via the at least one antenna, a forwarding request message from the source wireless node based on the association message; and a processor configured to determine, upon receiving the forwarding request message, based on a quality of a first link between the source wireless node and the wireless node, a quality of a second link between the wireless node and the destination wireless node, and a quality of a third link between the source wireless node and the destination wireless node, whether it is preferable to send the data from the source wireless node directly to the destination wireless node or to send the data from the source wireless node to the destination wireless node via the wireless node, comprising determining, upon receiving the forwarding request message, it is preferable to send the data from the source wireless node directly to the destination wireless node if the quality of the first link is below a threshold, the quality of the second link is below the threshold, and the quality of the third link is above the threshold, wherein:

the transceiver is also configured to transmit, in response to the forwarding request message based on the determination, a forwarding denial message to the source wireless node.

* * * * *